United States Patent
Krüger et al.

(12) 
(10) Patent No.: US 6,365,054 B1
(45) Date of Patent: Apr. 2, 2002

(54) PLANT FOR FILLING CONTAINERS AND A METHOD FOR OPERATING A PLANT FOR FILLING CONTAINERS

(75) Inventors: Roland Krüger, Herdecke; Markus Kolczyk, Waldstetten; Rainer Kuhnt; Dietmar Oechsle, both of Schwäbisch-Gmünd, all of (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 0 days.

(21) Appl. No.: 09/574,516

(22) Filed: May 19, 2000

Related U.S. Application Data (63) Continuation-in-part of application No. PCT/EP99/05779, filed on Aug. 9, 1999, and a continuation-in-part of application No. 09/551,126, filed on Apr. 18, 2000, now abandoned.

(30) Foreign Application Priority Data

Sep. 22, 1998 (DE) .......................................... 198 43 308

(51) Int. Cl.[7] .......................... B01D 37/00; B01D 29/62
(52) U.S. Cl. .................... 210/797; 210/798; 210/323.2; 210/332; 210/333.01; 210/409; 210/411; 134/22.18; 141/1; 141/98
(58) Field of Search ................................. 210/791, 797, 210/798, 323.2, 332, 333.01, 407, 409, 411, 413, 414; 141/1, 98; 134/22.1, 22.18

(56) References Cited

U.S. PATENT DOCUMENTS 3,637,079 A * 1/1972 Strub .......................... 210/456
4,163,724 A * 8/1979 Muller et al. ................ 210/334
4,213,861 A    7/1980 Müller et al. ........... 210/333.01
5,114,596 A * 5/1992 Laferra .................... 210/333.01

FOREIGN PATENT DOCUMENTS

| DE | 2363040 | 10/1975 |
|----|---------|---------|
| EP | 0481391 A3 | 4/1992 |
| EP | 0481391 A2 | 4/1992 |
| GB | 1230833 | 5/1971 |

OTHER PUBLICATIONS

"Filtration," Kirk–Othmer, Encyclopedia of chemical Techology, Fourth Edition, vol. 10, Explosives and Propellants to Flame Retardants for Textiles, pp. 788–789 and pp. 820–821.

"Liquid–Solid Operations and Equipment," Perry's Chemical Engineers' Handbook, Seventh Edition, Robert H. Perry, Don W. Green, 1997, The McGraw–Hill Companies, Inc., pp. 18–92–18–93 and 18–96.

* cited by examiner

Primary Examiner—Robert J. Popovics
(74) Attorney, Agent, or Firm—Nils H. Ljungman & Associates (57) ABSTRACT

A method of operating a plant for filling containers by moving a liquid such as water through an apparatus with at least one portion for receiving the liquid before it is filtered and at least one portion for receiving the liquid after it is filtered, so that the liquid moves from at least an upper area of apparatus to lower area of the apparatus to be transferred to bottles or other containers.

20 Claims, 5 Drawing Sheets

PLANT FOR FILLING CONTAINERS AND A METHOD FOR OPERATING A PLANT FOR FILLING CONTAINERS

CONTINUING APPLICATION DATA

This application is a Continuation-In-Part application of International Patent Application No. PCT/EP99/05779, filed on Aug. 9, 1999, which claims priority from Federal Republic of Germany Patent Application No. 198 43 308.5, filed on Sep. 22, 1998. International Application No. PCT/EP99/05779 was pending as of the filing date of the above-cited application. The United States was an elected state in International Application No. PCT/EP99/05779.

This application is also a Continuation-In-Part application of U.S. patent application Ser. No. 09/551,126, filed on Apr. 18, 2000, (now abandoned) and incorporated herein by reference.

BACKGROUND OF THE INVENTION

1. Field of the Invention

The present invention may relate to a plant for filling containers and a method of operating a plant for filling containers.

2. Background Information

In a known method of cleaning filter equipment, the filter cake produced at the filter on the side of the unfiltrate of the filter equipment is removed thereby that the interior space at the inlet-side, as well as part of the filtrate space positioned above the interior space at the inlet-side, is filled with water from the unfiltrate side when the exit-side is closed, such that the air positioned above the water is compressed in the filtrate space. Upon introduction of water and compression of the air in the upper space of the filtrate space, a discharge is opened all of a sudden such that the air under pressure causes an intense back-flow of the water present in the filtrate space, through the filter, and thereby the filter cake accumulated on the unfiltrate side of the filter is removed from the filter, and is mixed with the water present in the unfiltrate space, and with this is removed through the drain from the filter equipment.

This method is rather simple, but has the decisive disadvantage which is to be seen therein that the filter cake removed from the filter is mixed with such a volume of water which is nearly equal to the total volume of both interior spaces of the filter equipment. Since this water which includes the filter cake can not be passed to sewage in this condition, subsequently a laborious separation of the sludge from the water is necessary. This is the cause of high equipment costs and not insignificant operating costs. Subsequently, the unfiltrate space or, respectively, its walls need to be cleaned.

In a further known method for cleaning filter equipment with installed filter, a cleaning fluid is brought to an overpressure, in a separate container, and for carrying out the cleaning, is brought, via an inlet conduit, to the removal-side of the filter equipment, and from there is pressed through the filter in the direction opposite to the direction of filtration. For moving the cleaning fluid from the accumulated, or special, container to the filter equipment, a gaseous medium under overpressure is used.

As cleaning medium, usefully, water is employed and as gaseous medium air is used. For distribution of the cleaning fluid serve nozzle-shaped constrictions arranged, respectively, at the candle end on the removal-side, or impact bodies arranged at a distance from such constriction in the candle interior, by which the in-flowing cleaning fluid is deflected to all sides in the direction of the interior walls of the candles.

This has the disadvantage that the nozzle-shaped constrictions are present for the introduction of cleaning fluid into the interior of the filter candle, as well as for the air under pressure, such that on termination of a pressure impulse, a post-flow, or, in other words, a trailing or tailing type of flow behavior, of cleaning fluid is not possible. Cleaning of the interior of the boiler or, respectively, its walls is not possible with this method.

Furthermore, it is known to clean the lower portion of a boiler filter with a group of nozzles which extend vertically and in circumferential manner.

Such a cleaning method allows only cleaning of the free space beneath the filter candles. Wall sections disposed above the free space of the boiler filter, accordingly, can not be impacted and cleaned in accordance with the requirements. In addition, due to being fixedly secured at a rotor, the nozzle groups create a uniform or, particularly, a stream of spray which is constant with respect to position, which allows only impacting of definite areas.

In other words, one possible advantage of the present invention, in at least one possible embodiment, is concerned in one aspect with cleaning of the filter housing of filters with candles or elements of a tubular filter arrangement, in which vertical tubes or cartridges, in other words, candles, are supported by a filtrate-chamber tube sheet in a vertical cylindrical vessel, compare pages 18–92 and 18–93 in "Liquid-Solid Operations and Equipment" in PERRY'S CHEMICAL ENGINEERS' HANDBOOK, Seventh Edition, Robert H. Perry and Don W. Green, 1997, The McGraw-Hill Companies, Inc., ISBN 0-07-049841-5, incorporated herein by reference.

Also in other words, in filtration is achieved the separation of two phases, particulate form, i.e., solid particles or liquid droplets in suspension, and continuous, i.e., liquid or gas, from a mixture, herein also referred to as unfiltrate or liquid to be filtered, by passing the mixture through a porous medium. This may be cylindrical element filters, often referred to as candle filters, in which cylindrical elements or sleeves may be mounted vertically and suspended from a header sheet, which divides the filter vessel into two separate compartments. One possible advantage of candle filters or filter elements may be that as the cake grows on the tubular elements the filtration area increases and the thickness of a given volume of cake is therefore less than it would be on a flat element, compare Filtration, in Volume 10 of KIRK-OTHMER, ENCYCLOPEDIA OF CHEMICAL TECHNOLOGY, Fourth Edition, Jacqueline I. Kroschwitz, editor, 1993, John Wiley & Sons, Inc., ISBN 0-471-52679-9 (v. 10), also incorporated herein by reference.

OBJECT OF THE INVENTION

One possible object of the present invention may be to contact the inner walls of such a filter commencing already at the upper portion, essentially in all-around manner with cleaning liquid.

SUMMARY OF THE INVENTION

In at least one possible embodiment, the present invention preferably teaches that this object can be accomplished by the method of cleaning filter housings of the type described in the foregoing, thereby that in the upper region of the unfiltrate portion a cleaning medium is directed against the lower wall of the intermediate bottom and/or the upper region of the wall of the unfiltrate portion, with such a direction of flow that a substantially closed cleaning film, flow, or sheet of water or other liquid can be guided, from the upper wall of the unfiltrate portion, downwardly along this wall.

In at least one possible embodiment of the present invention, it may be further suggested that the cleaning medium is introduced in the upper region of the unfiltrate portion from the exterior and is, as a film, guided in circumscribing manner.

For a boiler filter it may be further contemplated that the cleaning device is configured as one in the upper, outer region of the unfiltrate portion extending spray ring, the spray nozzles of which are directed against the lower boiler wall of the intermediate bottom and/or are directed against the upper region of the wall of the unfiltrate portion and co-act with a flow directing apparatus.

Furthermore, it may be contemplated that the cleaning device is comprised of a recess in the support region of the intermediate bottom upon the unfiltrate portion, and this can be contacted with cleaning liquid introduced from the exterior.

With the method in accordance with at least one possible embodiment of the present invention and a proposed apparatus, an essentially advantageous cleaning of the wall parts of such an unfiltrate portion may be carried out in an essentially simple manner. Particularly, there may be provided a substantially closed rinsing film or sheet which, practically, may take its course from the upper wall region to the bottom and flushes away the still softened components of the unfiltrate or, particularly, the sludge, cake, filter cake, or deposit mass.

When use is made of a circumferential flush pipe, inlet pipe, or spray ring, or a plurality of at least one of these structures, by aimed distribution of the cleaning liquid with flow direction against the upper wall parts, which are sloped accordingly, there may be produced an optimal film. This formation can experience a further enhancement, through periodical impacting of the nozzles of such a spray ring. Particularly, an additional peeling effect may be attained.

The same effect may also be achieved, when the cleaning liquid is introduced from the exterior and its volume is controlled in such a manner that also a rinsing film is passed to the walls.

In accordance with one aspect of the present invention, there may be provided a method of operating and cleaning filter apparatus having filter candles, at least a portion for receiving liquid to be filtered, and a portion for receiving liquid when filtered, said method comprising the steps of: (a) moving a first batch of liquid to be filtered in a first direction from said portion for receiving liquid to be filtered through said filter candles from a first surface to a second surface of said filter candles and thereby collecting solids at said first surface of said filter candles as filter cake; (b) terminating filtering according to step (a); (c) initiating a first flow of cleaning liquid along a first flow path, over said second surface, for inducing removal of filter cake from said filter candles by flowing a sheet of cleaning liquid over said second surface; (d) pressurizing and directing a flow of gaseous medium in a second flow path separate from said first flow path to force said sheet of cleaning liquid flowing on said second surface through said filter candles from said second surface to said first surface, to dislodge filter cake on said first surface; (e) removing filter cake from said first surface of said filter candles by the interaction of cleaning liquid and gaseous medium; (f) initiating a second flow of cleaning liquid to supply at least said portion for receiving liquid to be filtered with cleaning liquid; (g) directing said second flow of cleaning liquid along the wall of said portion for receiving liquid to be filtered thereby to dislodge solids from said wall; (h) terminating cleaning according to step (e); (i) terminating said second flow of cleaning liquid; (j) removing dislodged solids; and (k) moving a second batch of suspension in said first direction through said filter elements.

In accordance with another aspect of our invention, there may be provided a method of operating and cleaning filter apparatus having filter candles, at least a portion for receiving a liquid to be filtered, and a portion for receiving liquid when filtered, said method comprising the steps of: (a) moving a first batch of liquid to be filtered in a first direction from said portion for receiving a liquid to be filtered through said filter candles from a first surface to a second surface of said filter candles and thereby collecting solids at said first surface of said filter candles as filter cake; (b) terminating filtering according to step (a); (c) initiating a first flow of cleaning liquid along a first flow path, over said second surface, for inducing removal of filter cake from said filter candles by flowing a sheet of cleaning liquid over said second surface; (d) pressurizing and directing a flow of gaseous medium in a second flow path separate from said first flow path to force said sheet of cleaning liquid flowing on said second surface through said filter candles from said second surface to said first surface, to dislodge filter cake on said first surface; (e) removing filter cake from said filter candles by the interaction of cleaning liquid and gaseous medium; (f) initiating a second flow of cleaning liquid to supply at least said portion for receiving liquid to be filtered with cleaning liquid; (g) directing said second flow of cleaning liquid to dislodge solids; (h) terminating cleaning according to Step (e); (i) terminating said second flow of cleaning liquid; (j) removing dislodged solids; and (k) moving a second batch of suspension in said first direction through said filter elements.

In accordance with yet another aspect of our invention, there may be provided a method of operating and cleaning filter apparatus having filter candles, at least a portion for receiving liquid to be filtered, and a portion for receiving liquid when filtered, said method comprising the steps of: (a) moving a first batch of liquid to be filtered in a first direction from said portion for receiving a liquid to be filtered through said filter candles from a first surface to a second surface of said filter candles and thereby collecting solids at said first surface of said filter candles as filter cake; (b) terminating filtering according to step (a); (c) initiating a first flow of cleaning liquid to said second surface; (d) pressurizing and directing a flow of gaseous medium to force cleaning liquid through said filter candles from said second surface to said first surface, to dislodge filter cake on said first surface; (e) removing filter cake from said filter candles by the interaction of cleaning liquid and gaseous medium; (f) initiating a second flow of cleaning liquid to supply at least said portion for receiving liquid to be filtered with cleaning liquid; (g) directing said second flow of cleaning liquid on the wall of said portion for receiving liquid to be filtered in a flowing sheet of cleaning liquid thereby to dislodge solids from said wall; (h) terminating said first flow of cleaning liquid according to step (c); (i) terminating flow of gaseous medium according to step (d);(j) terminating said second flow of cleaning liquid according to step (f); (k) removing dislodged solids; and (l) moving a second batch of suspension in said first direction through said filter elements.

Still in accordance with another aspect of our invention, there may be provided a method of operating and cleaning filter apparatus having filter candles, at least a portion for receiving a liquid to be filtered, and a portion for receiving liquid when filtered, said method comprising the steps of: (a) moving a first batch of liquid having solids suspended therein in a first direction from said portion for receiving liquid to be filtered through said filter candles from a first surface to a second surface of said filter candles and thereby collecting solids at said first surface of said filter candles as filter cake; (b) terminating filtering according to step (a); (c) removing filter cake from said filter candles by the interaction of cleaning liquid and gaseous medium; (d) initiating a second flow of cleaning liquid to supply at least said portion for receiving liquid to be filtered with cleaning liquid; (e) directing said second flow of cleaning liquid on the wall of said portion for receiving liquid to be filtered in a flowing sheet of cleaning liquid thereby to dislodge solids from said wall; (f) terminating cleaning according to step (c); (g) terminating said second flow of cleaning liquid; (h) removing dislodged solids; and (i) moving a second batch of suspension in said first direction through said filter elements.

A further aspect of our invention may reside broadly in a plant in which containers are filled with liquid, comprising: apparatus for moving containers to a filling machine; a machine for filling said containers with liquid when filtered; apparatus for removing filled containers from said filling machine, said liquid when filtered being provided by apparatus for providing a liquid to be filtered in a first batch to a candle filter apparatus comprising: a portion for receiving liquid to be filtered; a portion for receiving liquid when filtered; an intermediate bottom between said portion for receiving liquid to be filtered and said portion receiving liquid when filtered; a plurality of filter candles operatively connected to said intermediate bottom, to filter liquid received from said portion for receiving liquid to be filtered and passing filtered liquid to said portion for receiving liquid when filtered, and said filter candles extending into said portion for receiving liquid to be filtered; apparatus for moving a first batch of liquid to be filtered in a first direction from said portion for receiving liquid to be filtered through said filter candles from a first surface to a second surface of said filter candles and thereby collecting solids at said first surface of said filter candles as filter cake; apparatus for terminating filtering; apparatus for initiating a first flow of cleaning liquid along a first flow path, over said second surface, for inducing removal of filter cake from said filter candles by flowing a sheet of cleaning liquid over said second surface; apparatus for pressurizing and directing a flow of gaseous medium in a second flow path separate from said first flow path to force said sheet of cleaning liquid flowing on said second surface through said filter candles from said second surface to said first surface, to dislodge filter cake on said first surface; apparatus for removing filter cake from said first surface of said filter candles by the interaction of cleaning liquid and gaseous medium; apparatus for initiating a second flow of cleaning liquid to supply at least said portion for receiving liquid to be filtered with cleaning liquid; apparatus for directing said second flow of cleaning liquid along the wall of said portion for receiving liquid to be filtered thereby to dislodge solids from said wall; apparatus for terminating said first flow of cleaning liquid; apparatus for terminating said second flow of cleaning liquid; apparatus for removing dislodged solids; and apparatus for moving a second batch of suspension in said first direction through said filter elements.

In accordance with another aspect of our invention, there may be provided a candle filter apparatus, comprising: a vessel having a portion for receiving liquid to be filtered and a portion for receiving liquid when filtered; a plurality of filter candles operatively connected to said portion for receiving liquid to be filtered, to filter liquid received from said portion for receiving liquid and passing it to said portion for receiving liquid when filtered; and apparatus connected to said vessel and configured to direct cleaning liquid at least against the wall of said portion for receiving liquid to be filtered to dislodge solids from said wall.

The above-discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein.

DESCRIPTION OF THE PREFERRED EMBODIMENTS

Figure 1:
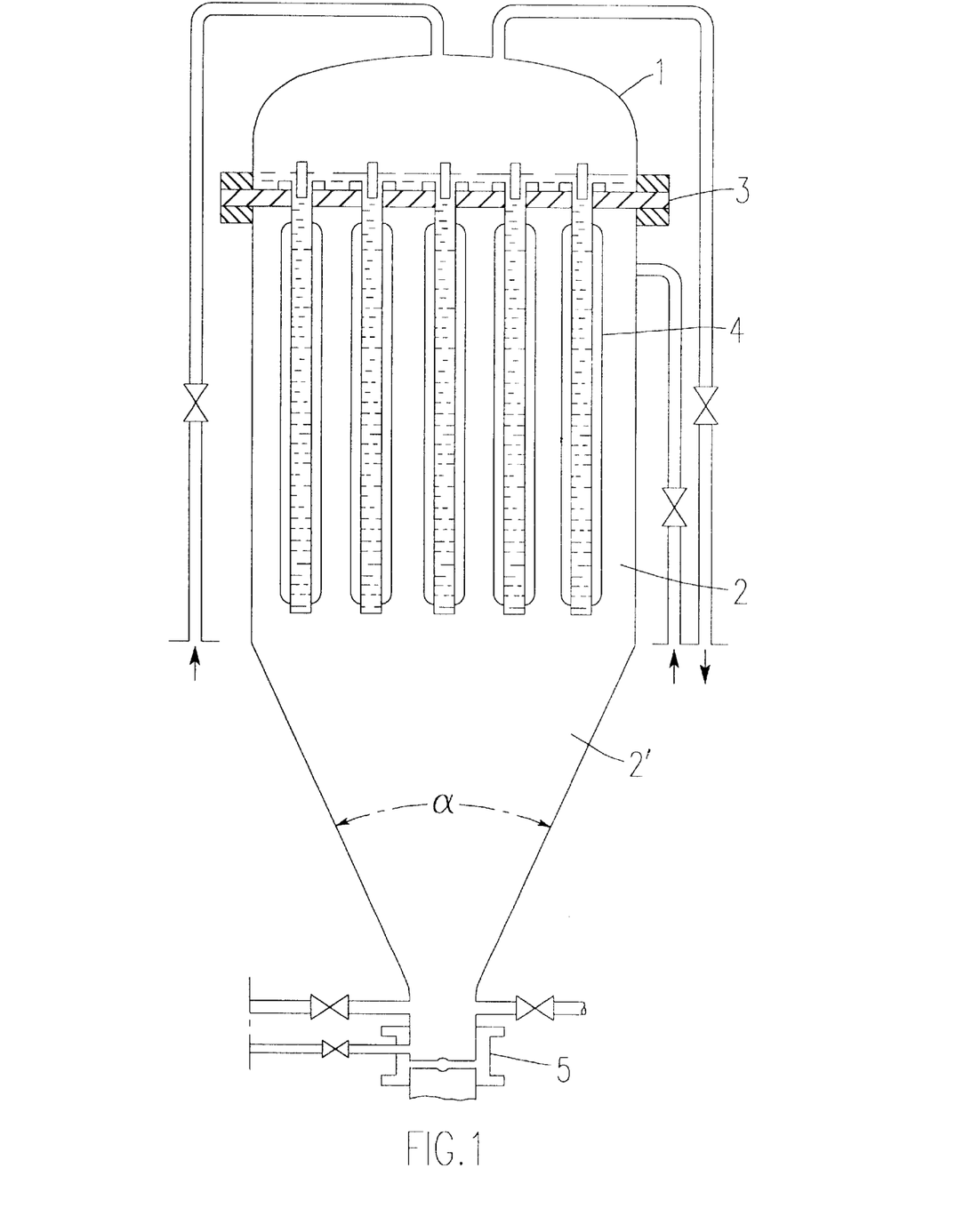
FIG. 1 is a boiler filter shown in schematic outline.

The reference numeral 1 designates a dome-shaped filtrate space of the boiler filter, as filter equipment, beneath which is an unfiltrate space 2. The unfiltrate space 2 is comprised of a cylindrical collector space 2', which narrows towards the bottom in conical manner, and the angle of opening alpha of which is approximately 40 to 70 degrees. Both spaces 1 and, respectively, 2 are separated from one another by an intermediate bottom 3 with bores for receiving therein filter elements 4. The lower part of the collector space 2' has a nozzle 5, which serves in the introduction and in the suitable distribution of the unfiltrate, and for removal of the filter residues.

FIGS. 2 to 8 of the drawings show the upper region, drawn to a larger scale, of the unfiltrate portion, with simplified showing of the intermediate bottom 3, without filter elements 4 which are evident from FIG. 1. In accordance with the embodiment shown in FIG. 2, at the upper end of the unfiltrate portion 2, in the region of the connecting flange (6) at the intermediate bottom 3, there is provided a groove (7), preferably of circumferential configuration. There is also provided, at a distance from the groove (7), a spray ring 8 which also extends in a circumjacent, substantially circular, or circumferentially adjacent manner and has a plurality of spray nozzles 9 which can be supplied with cleaning liquid, which is fed to the spray ring 8 by means of an inlet pipe 68 (shown in FIG. 11). The spray nozzles 9 can be configured as wide-stream nozzles such that a rather extensive area is covered with cleaning liquid. The cleaning liquid spray is directed against the outer lower wall 10 of the intermediate bottom 3, which, in this embodiment, acts as flow directing apparatus, and which forces the liquid into the circumferential groove 7 such that a closed liquid film 11 extends from the upper wall 12 of the unfiltrate space or portion 2 in downward direction.

Figure 2:
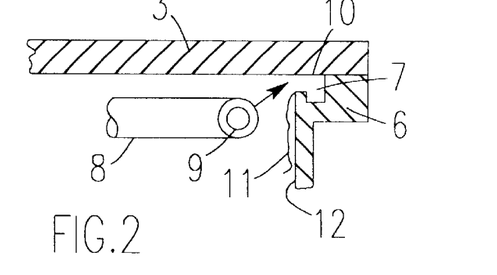
FIGS. 2 to 8 show several embodiments for cleaning with different flow directing apparatus.

Supply of cleaning liquid to the spray ring 8 or, respectively, the spray nozzles 9 can be done periodically, which achieves an improved cleaning effect at the wall 12 of the unfiltrate portion 2.

That is to say, the cleaning medium or liquid can be introduced periodically or intermittently during each cleaning cycle.

Figure 3:
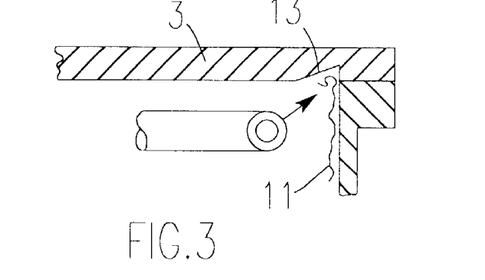

In FIG. 3 there is shown a recess 13 in the region of the perimeter of the intermediate bottom 3, which recess 13 also serves to divert and direct the impinging spray stream to the wall 12 of the unfiltrate portion 2.

Figure 4:
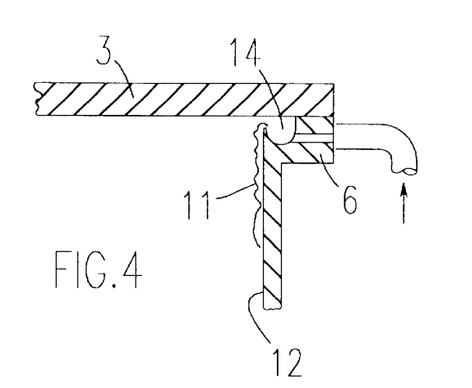
Figure 5:
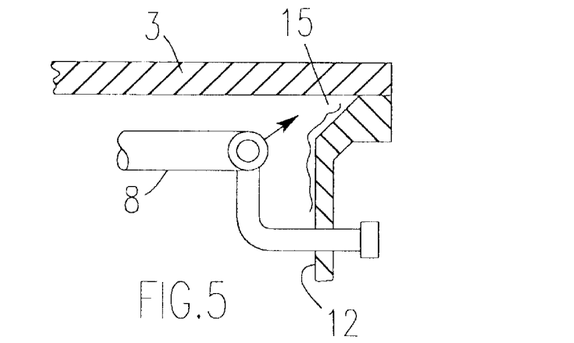

FIG. 4 shows a further recess 14 in the region of the upper connecting flange 6 of the unfiltrate boiler, whereby this further recess 14 is supplied with cleaning liquid from the exterior. In accordance with the embodiment shown in FIG. 5, the connecting flange 6 has a chamber 15 on the side which is facing the interior of the unfiltrate portion, from which the spray jets, on being combined into a film upon flow diversion, are directed to the lower portion.

Figure 6:
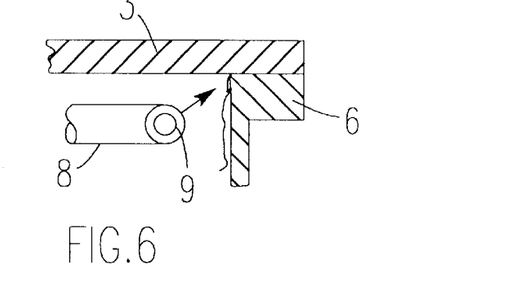

FIG. 6 shows the spray ring 8 with spray nozzles 9, the stream jets of which, on having been diverted as to flow, are directed to the lower wall 10 of the wall 12 of unfiltrate portion 2. Special recesses, as existing in the other embodiments, are not provided in this embodiment.

Figure 7:
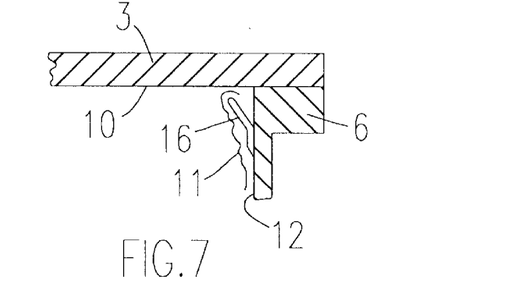
Figure 14:
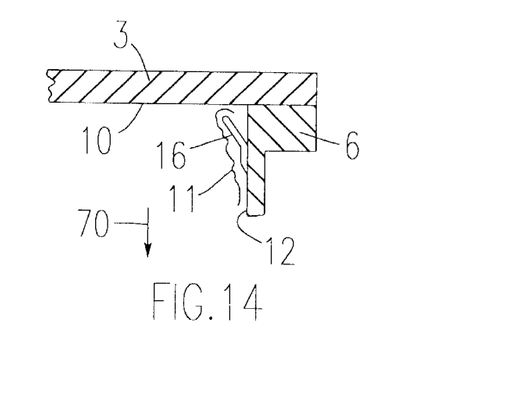

In the embodiment shown in FIG. 7, the wall 12 of the unfiltrate portion 2 has a circumferential sheet metal ring 16, secured by welding or otherwise, which provides a corresponding groove 16 which is supplied from the spray nozzles 9, or directly from the exterior, and also serves to create a film in downwardly running manner 70 (shown in FIG. 14).

Figure 8:
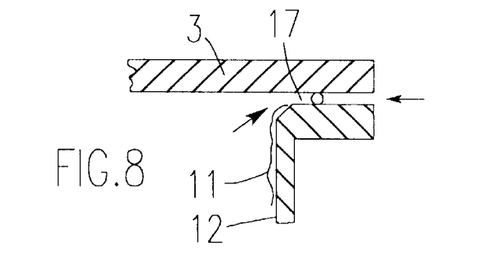

The embodiment in accordance with FIG. 8 shows spray jets which are directed into the portion 17 provided intermediately in the space remaining between flange 6 and intermediate bottom 3, whereby the spray jets are also redirected and flow downwardly along the wall in closed formation of the desired liquid film. There can be provided, simultaneously, in this region a supply of the spray liquid in the direction of arrow 18 from the exterior whereby the seal which separates the intermediate bottom from the flange, is in places discontinuous at such locations for introduction of cleaning liquid.

Figure 9:
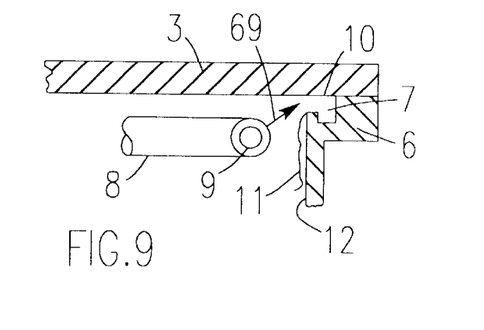
FIGS. 9 to 15 are duplicates of FIGS. 2 to 8 with additional information.
Figure 10:
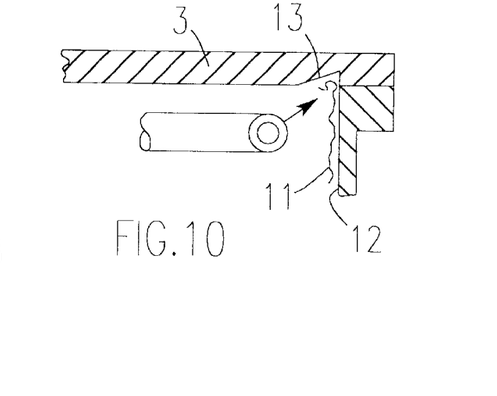
Figure 11:
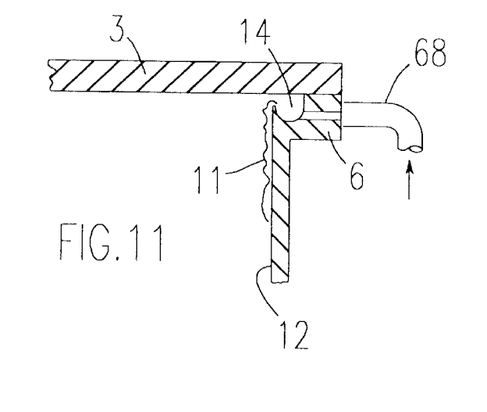
Figure 12:
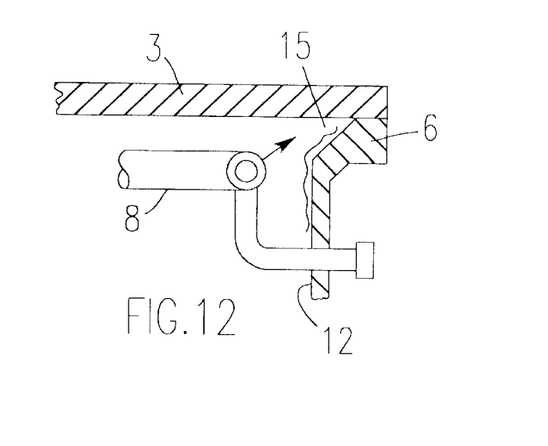
Figure 13:
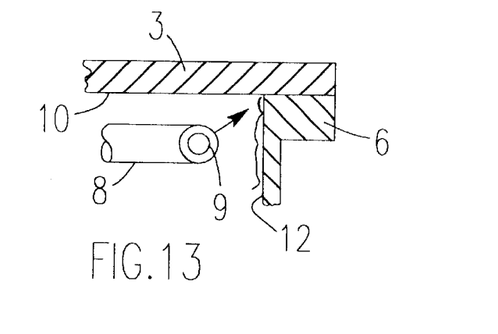
Figure 15:
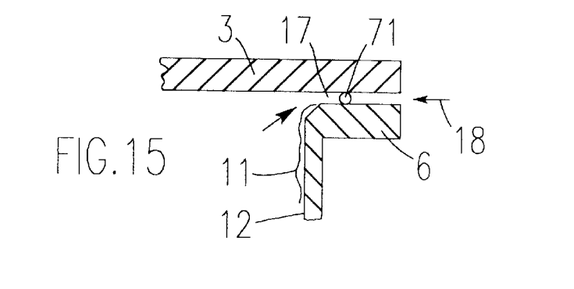

FIGS. 9 to 15 are duplicates of FIGS. 2 to 8 with additional information. For example, FIG. 9 shows a direction 69 in which a cleaning liquid or another liquid may be moved, possibly by at least one spray ring 8. FIG. 10 shows the upper wall 12 of the unfiltered portion or area 2. FIG. 11 shows an inlet pipe 68 through which liquid or gas may be transferred to the filter apparatus. FIG. 12 shows connecting flange 6. FIG. 13 shows the lower wall 10 of the wall 12. FIG. 14 shows a downward direction 70 in which liquid may move. FIG. 15 shows a spray jet or spray jets 70 and the direction of liquid 18 into the filter apparatus, as well as the connecting flange 6.

Further variations can be provided with which one possibly desired aim, of a substantially closed and coherent liquid film 11 along the wall 12, can be achieved. Also, several spray rings may be provided, within the extent of the unfiltrate portion, in the manner that they are arranged at different levels with respect to one another, and to directly guide the spray jets 71 against the wall of the boiler or into corresponding recesses.

Figure 16:
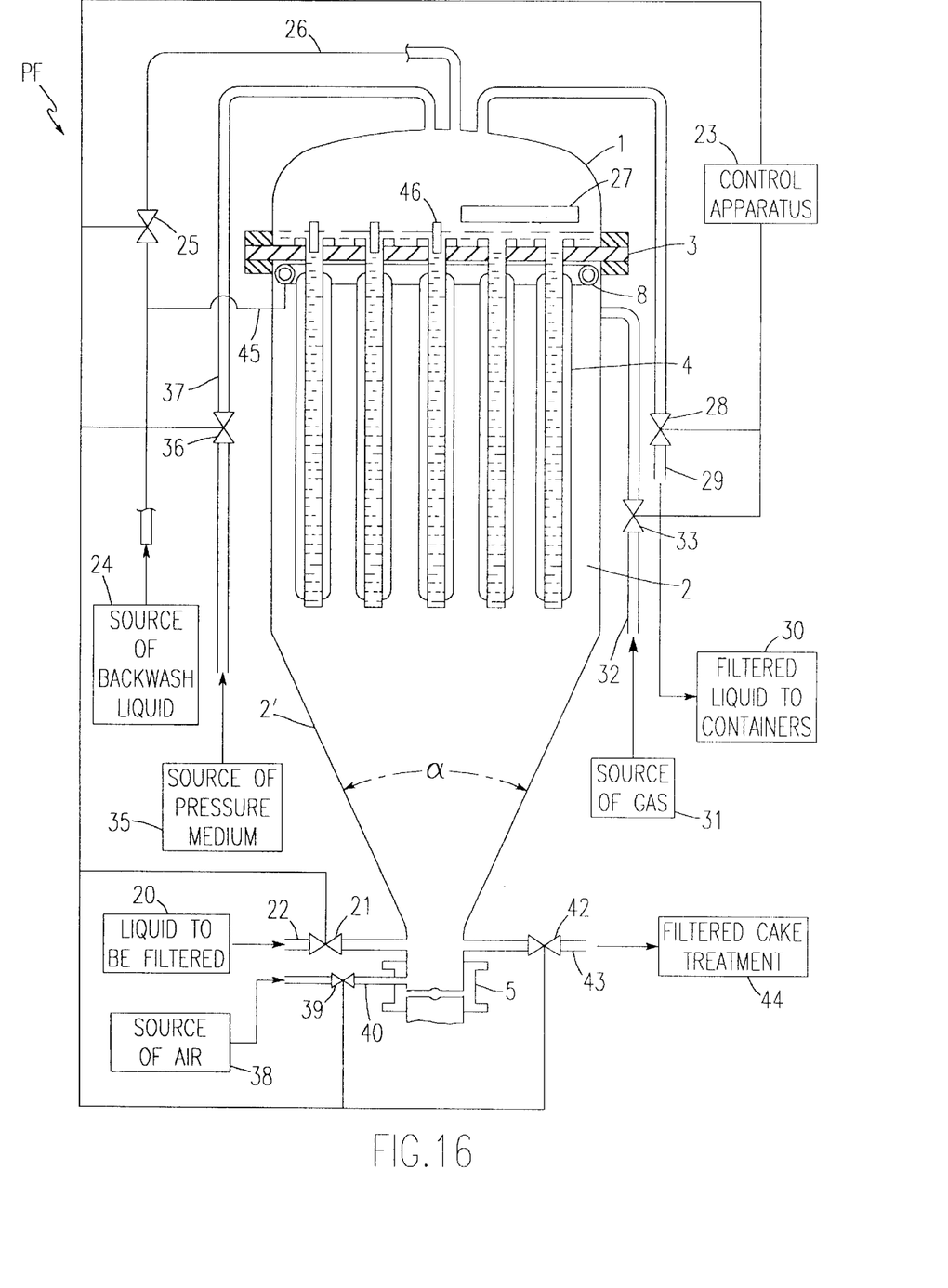
FIG. 16 shows an assembly for filtering and filling containers, such as beverage containers.

In other words, with reference to FIG. 16, numeral 1 designates a dome-shaped or bonnet-shaped filtrate space, compartment or portion for receiving liquid when filtered, and a portion for receiving liquid to be filtered 2. Both portions 1 and, respectively, 2 are separated from one another by an intermediate partition, platform or header 3, with bores for receiving therein filter elements such as filter candles 4. The lower part of the collector space 2' has a nozzle or the like gate means or assembly 5, which serves in the introduction and in the suitable distribution of the unfiltrate and for the removal of the filter residues.

In accordance with the embodiment shown in FIG. 16, liquid to be filtered is introduced into the vessel PF at the conical bottom 2', see reference numeral 20, by being passed through a valve 21 in line or conduit 22. Valve 21 is connected to a control apparatus 23 by suitable communication. From a source of backwash or cleaning liquid, generally identified by reference numeral 24, the cleaning liquid passes through valve 25 and line 26 to the filtrate compartment 1. The valve 25 is also connected to the control apparatus 23. A sensor or the like monitor 27, connected to control apparatus 23, serves to monitor the volume of cleaning liquid. Filtered liquid is removed from portion 1 through valve 28 in line or conduit 29, to be passed to containers, e.g. beverage containers. This step is generally identified by reference numeral 30. A source of gas 31 may be used to pressurize the suspension, and the attendant conduit 32 is controlled with valve 33. To remove filter cake from filter elements 4 a source of pressure medium 35 supplies a gaseous medium under pressure through a valve 36 in line 37 to top portion 1. The valve 36 is operatively connected to the control apparatus 23. Filter cake is removed at gate 5 using a source of air 38, subject to a valve 39 in line or conduit 40. Thus, by means of conduit 40, which is connected with the nozzle distribution ring or gate means 5, air is introduced into the collecting space 2'. This serves to homogenize the filter aid and sludge mixture. This step is concluded within a short period of time and through conduits 37 or 32 pressurized gas is introduced into the unfiltrate portion 2, 2' for removal of the solid filter aid mass, which has a consistency for being capable of handling with a shovel. The filter aid mass is passed by means of conduit 43 to a wagon or a dump box, not shown. The reference numeral 42 designates a valve in conduit 43 leading to a filter cake treatment station 44.

The spray ring 8 is supplied by line 45 which is also subject to control apparatus 23.

Reference numeral 46 generally designates apparatus for cleaning filter candles or elements 4.

Figure 17:
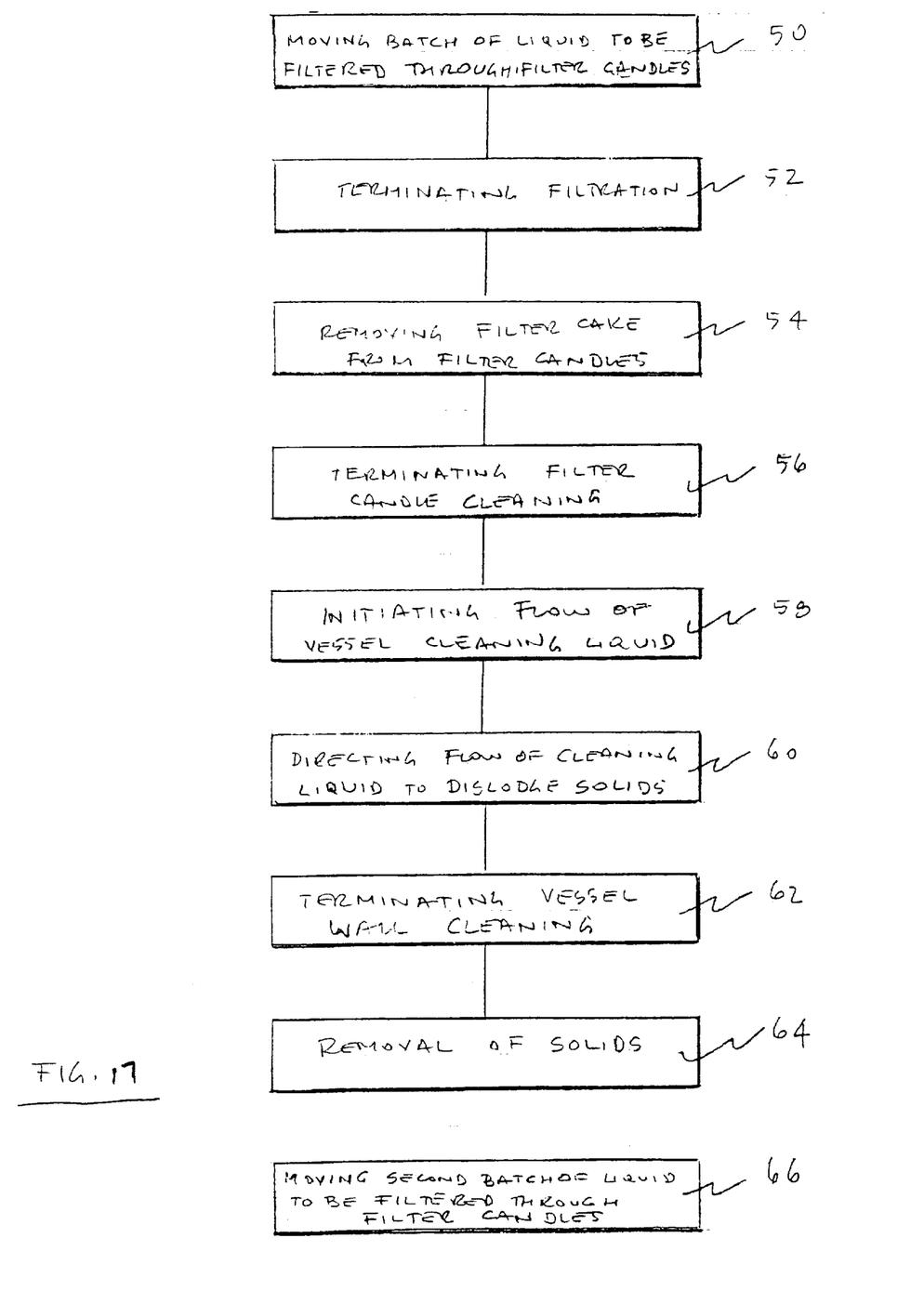
FIG. 17 is a block diagram outlining a method in accordance with one possible embodiment of the present invention.

In FIG. 17 is depicted a method of operating the plant or filter apparatus, wherein a first batch of liquid to be filtered is provided to the unfiltrate compartment, or portion for receiving liquid to be filtered, of the boiler filter PF, or the like vessel of filtration equipment, and this liquid is passed through candle filter elements 4 as described hereinabove, in step 50. Upon termination 52 of filtering, a cleaning liquid, or fluid or medium, is passed through the filter candle elements 4 and a gaseous medium under pressure is also passed through the candle filter elements, such as 4, to dislodge filter cake from the filter candles or elements 4. The details of such operation, generally identified by reference numeral 54, are shown in U.S. patent application Ser. No. 09/551,126, filed on Apr. 18, 2000, incorporated herein by reference. Thus, filter cake removal 54 is done under interaction of cleaning liquid and gaseous medium under pressure and containers, such as beverage containers, can be filled with the filtrate, or liquid when filtered. This is generally identified by reference numeral 30 (FIG. 16).

With reference to FIG. 17, cleaning of filter candles 4 is terminated in step 56, but initiation 58 of flow of cleaning fluid or cleaning liquid, herein also refereed to as cleaning medium, for the portion for receiving liquid to be filtered 2 of vessel PF may be done simultaneously with cleaning 54.

Reference numeral 60 designates a step of directing a flow of cleaning liquid, or cleaning medium, along the wall 12 of the vessel PF. Termination of flow of cleaning liquid and removal of solids collected with the cleaning medium or fluid are identified, respectively, by reference numerals 62 and 64. The cycle can then be repeated with a second batch of liquid to be filtered, reference numeral 66.

In FIG. 16, the cleaning liquid spray is directed against the outer lower wall 10 of the intermediate bottom 3, which, in this embodiment, acts as flow directing apparatus, and which forces the liquid into the circumferential groove 7, possibly in a direction indicated by reference numeral 69,such that a closed liquid film 11 extends from the upper wall 12 of the unfiltrate space or portion 2 in downward direction.

The present invention may relate to a method of operating a bottling plant having an apparatus that may filter liquid for filling bottles and clean filter housings for the unfiltered portion of boiler filters, whereby structures for gathering solids or sludge resulting from filtering may be held by an intermediate bottom which separates the filter portion from the unfiltrate or unfiltered portion of the apparatus, and which apparatus can be impacted with cleaning liquid, as well as to apparatus for cleaning such filter housings.

The present invention may relate to a method of cleaning filter housings, especially for cleaning of the unfiltrate portion of boiler filters, whereby filter candles may be held by an intermediate bottom which may separate the filter portion from the unfiltrate portion, and the unfiltrate portion can be impacted with cleaning liquid, as well as to apparatus for cleaning such filter housings.

It may be an aim, in at least one possible embodiment of the present invention, to contact the inner walls of such a filter with cleaning liquid already from the upper portion, essentially in an all-around manner.

For this, at least one possible embodiment of the present invention preferably provides or teaches that in the upper region of the unfiltrate portion a cleaning medium is directed against the lower wall of the intermediate bottom and/or the upper region of the wall of the unfiltrate portion, with such a direction of flow that a substantially closed cleaning film can be guided, from the upper wall of the unfiltrate portion, downwardly along this wall.

One feature of the invention resides broadly in the method of cleaning filter housings, especially for cleaning of the unfiltrate portion of boiler filters, whereby filter candles are held by an intermediate bottom which separates the filter portion from the unfiltrate portion, and the unfiltrate portion can be impacted with cleaning liquid, characterized thereby that in the upper region of the unfiltrate portion 2 a cleaning medium is directed against the lower wall of the intermediate bottom and/or the upper region of the wall of the unfiltrate portion 2 with such a direction of flow that a substantially closed cleaning film 11 can be guided from the upper wall 12 of the unfiltrate portion 2, downwardly along this wall.

Another feature of the invention resides broadly in the method which is characterized thereby that the cleaning medium is introduced in the upper region of the unfiltrate portion 2 from the exterior and is, as a film, guided in circumscribing manner along and down the wall 12 of the unfiltrate portion 2.

Yet another feature of the invention resides broadly in the method which is characterized thereby that the direction of flow at the upper region of the unfiltrate portion 2 is carried out by recesses 13, 14 at the outer edge of the intermediate bottom 3.

Still another feature of the invention resides broadly in the method which is characterized thereby that the direction of flow in the upper region of the unfiltrate portion 2 is carried out by recesses 13, 14, 15 in the wall 12 of the mantle of the boiler.

A further feature of the invention resides broadly in the method which is characterized thereby that the cleaning medium is passed to a groove 7 which is circumjacent in the boiler wall and out of this groove the cleaning medium can be directed as liquid film 11.

Another feature of the invention resides broadly in the method which is characterized thereby that a periodical impacting with cleaning medium is carried out.

Yet another feature of the invention resides broadly in the method which is characterized thereby that the cleaning medium is guided to recesses in the boiler wall which are arranged to be offset as to height with respect to one another and/or against this.

Still another feature of the invention resides broadly in a boiler filter for carrying out the method in accordance with the preceding paragraphs, consisting of an unfiltrate portion and filtrate portion which is separated from the unfiltrate portion by an intermediate bottom, whereby the intermediate bottom takes up filter candles which reach into the unfiltrate portion, and the unfiltrate portion is equipped with cleaning devices which is characterized thereby that the cleaning device is configured as one in the upper, outer region of the unfiltrate portion 2 extending spray ring 8, the spray nozzles 9 of which are directed against the outer boiler wall 10 of the intermediate bottom 3 and/or are directed against the upper region of the wall 12 of the unfiltrate portion 2 and co-act with a flow directing apparatus.

A further feature of the invention resides broadly in a boiler filter which is characterized thereby that the flow directing apparatus is configured as a circumjacent recess 13 in the region of the outer edge of the intermediate bottom 3.

Another feature of the invention resides broadly in a boiler filter which is characterized thereby that the flow directing apparatus is configured as a circumferential recess 14, 15 in the upper region of the inner wall of the boiler.

Yet another feature of the invention resides broadly in a boiler filter which is characterized thereby that the flow directing apparatus is configured as a groove 7 extending in circumferential manner in the upper boiler wall.

Still another feature of the invention resides broadly in a boiler filter which is characterized thereby that the flow directing apparatus is configured by wall components of the boiler and/or of the intermediate bottom.

A further feature of the invention resides broadly in a boiler filter which is characterized thereby that the cleaning device is configured as a recess 17 in the support region of the intermediate bottom 3 upon the unfiltrate portion 2 and this can be impacted with cleaning fluid introduced interiorly or exteriorly.

One feature of the invention resides broadly in a plant for filling containers with liquid, said plant comprising:

apparatus for moving containers to a filling machine;

a filling machine for filling said containers with liquid when filtered;

apparatus for removing filled containers from said filling machine;

said liquid when filtered being provided by apparatus for providing a liquid to be filtered in a first batch to a filter apparatus, said filter apparatus comprising:

a portion for receiving liquid to be filtered;

a portion for receiving liquid when filtered;

an intermediate portion between said portion for receiving liquid to be filtered and said portion receiving liquid when filtered;

a plurality of filter elements operatively connected to said intermediate bottom, to filter liquid received from said portion for receiving liquid to be filtered and passing filtered liquid to said portion for receiving liquid when filtered;

said filter elements generally disposed in said portion for receiving liquid to be filtered;

apparatus for moving a first batch of liquid to be filtered in a first direction from said portion for receiving liquid to be filtered through said filter elements from a first surface to a second surface of said filter elements and thereby collecting solids at said first surface of said filter elements as filter cake;

apparatus for terminating filtering;

apparatus for initiating a first flow of cleaning liquid along a first flow path, over said second surface, for inducing removal of filter cake from said filter elements by flowing a sheet of cleaning liquid over said second surface;

apparatus for pressurizing and directing a flow of gaseous medium in a second flow path separate from said first flow path to force said sheet of cleaning liquid flowing on said second surface through said filter elements from said second surface to said first surface, to dislodge filter cake on said first surface;

apparatus for removing filter cake from said first surface of said filter elements by the interaction of cleaning liquid and gaseous medium;

apparatus for initiating a second flow of cleaning liquid to supply at least said portion for receiving liquid to be filtered with cleaning liquid;

said portion for receiving liquid to be filtered comprising at least one wall;

apparatus for directing said second flow of cleaning liquid along said at least one wall thereby to dislodge solids from said at least one wall;

apparatus for terminating said first flow of cleaning liquid;

apparatus for terminating said second flow of cleaning liquid;

apparatus for removing dislodged solids; and apparatus for moving a second batch of suspension in said first direction through said filter elements.

Another feature of the invention resides broadly in a method of operating a plant for filling containers with liquid having an apparatus for moving filtered liquid to containers, said apparatus comprising:

at least two filter candles configured to support deposits of solids produced by filtration of liquid, each candle having a first surface and a second surface;

said deposits of solids comprising filter cake;

at least one portion for receiving liquid to be filtered;

said at least one portion for receiving liquid to be filtered comprising at least one wall;

said at least one wall comprising an upper area;

at least one portion for receiving filtered liquid;

an exterior and an interior;

said exterior being configured to permit movement of cleaning liquid into said interior; and said method comprising the steps of:

filtering, said filtering comprising moving a first batch of liquid to be filtered in a first direction from said portion for receiving liquid to be filtered along said first surface and said second surface of each of said at least two filter candles to collect filter cake on said first surface of each of said at least two filter candles;

terminating said step of filtering;

permitting a first flow of cleaning liquid along a first flow path and over said second surface of each of said at least two filter candles to remove filter cake from said at least two filter candles;

said first flow of cleaning liquid comprising a sheet of cleaning liquid;

pressurizing and directing a flow of a gaseous medium in a second flow path separate from said first flow path to force said sheet of cleaning liquid to move along said first surface of said at least two filter candles to remove said filter cake from said first surface of each of said at least two filter candles;

removing said filter cake from said first surface of each of said at least two filter candles by said step of permitting said first flow of cleaning liquid and said step of pressurizing and directing;

permitting a second flow of cleaning liquid to supply said at least one portion for receiving liquid with cleaning liquid;

directing said second flow of cleaning liquid along said at least one wall of said at least one portion for receiving liquid to remove filter cake from said wall;

terminating removal of said filter cake;

terminating said second flow of cleaning liquid; and removing any remaining filter cake.

Yet another feature of the invention resides broadly in a method of operating a plant for filling containers with liquid having a filter apparatus for moving filtered liquid to containers, said filter apparatus comprising:

a plurality of filter arrangements;

an area for receiving liquid to be filtered; and said area for receiving liquid to be filtered comprising at least one wall; and said method comprising the steps of:

moving a first batch of liquid having solids suspended therein in a first direction from said area for receiving liquid to be filtered through said filter candles from a first surface to a second surface of said filter candles and thereby collecting solids at said first surface of said filter candles as filter cake;

terminating filtering;

removing said filter cake from said filter candles by the interaction of cleaning liquid and gaseous medium;

moving a flow of cleaning liquid to supply at least said portion for receiving liquid to be filtered with cleaning liquid;

directing said flow of cleaning liquid on said at least one wall in a flowing sheet of cleaning liquid thereby to dislodge solids from said at least one wall;

terminating said flow of cleaning liquid; and moving a second batch of liquid having solids suspended therein in said first direction through said plurality of filter arrangements.

Some examples of apparatus and methods that may be used adapted for use with the present invention may be found in the following publications, which are hereby incorporated by reference as if set forth in their entirety herein: "Liquid-Solid Operations and Equipment", in PERRY'S CHEMICAL ENGINEERS' HANDBOOK, Seventh Edition, Robert H. Perry and Don W. Green, 1997, The McGraw-Hill Companies, Inc., ISBN 0-07-049841-5; and "Filtration", in Volume 10 of KIRK-OTHMER, ENCYCLOPEDIA OF CHEMICAL TECHNOLOGY, Fourth Edition, Jacqueline I. Kroschwitz, editor, 1993, John Wiley & Sons, Inc., ISBN 0-471-52679-9 (v. 10).

Some further examples of apparatus and methods which may possibly be used or adapted for use with at least one embodiment of the present invention, may be found in the following U.S. Patents, which are hereby incorporated by reference as if set forth in their entirety herein: U.S. Pat. No. 4,089,781 to Asp; U.S. Pat. No. 4,163,724 to M ller et al.; U.S. Pat. No. 4,213,861 to M ller et al.; U.S. Pat. No. 4,500,435 to M ller; U.S. Pat. No. 4,668,405 to Boze; U.S. Pat. No. 4,954,222 to Durr et al.; U.S. Pat. No. 5,051,194 to Bähr; U.S. Pat. No. 5,114,596 to Latera; U.S. Pat. No. 5,209,844 to Zievers et al.; and U.S. Pat. No. 5,477,953 to Powell et al.

Some other examples of apparatus and/or methods which may possibly be used or adapted for use with at least one embodiment of the present invention may be found in the following U.S. Patents, which are hereby incorporated by reference as if set forth in their entirety herein: U.S. Pat. No. 4,911,285 to Zodrow et al.; U.S. Pat. No. 4,944,830 to Zodrow et al.; U.S. Pat. No. 4,950,350 to Zodrow et al.; U.S. Pat. No. 4,981,547 to Zodrow et al.; U.S. Pat. No. 5,017,261 to Zodrow et al.; U.S. Pat. No. 5,062,917 to Zodrow; U.S. Pat. No. 5,062,918 to Zodrow; U.S. No. Pat. 5,078,826 to Rogall; U.S. Pat. No. 5,087,317 to Rogall; U.S. Pat. No. 5,110,402 to Buchholz et al.; U.S. Pat. No. 5,129,984 to Tomashauser et al., U.S. Pat. No. 5,167,755 to Zodrow et al.; U.S. Pat. No. 5,174,851 to Zodrow et al.; U.S. No. Pat. 5,185,053 to Tomashauser et al.; U.S. Pat. No. 5,217,538 to Buchholz et al.; U.S. Pat. No. 5,227,005 to Zodrow et al.; U.S. Pat. No. 5,5569,353 to Zodrow; and U.S. Pat. No. 5,713,403 to Clüsserath et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications, which were cited in the PCT Search Report dated Dec. 17, 1999 and/or cited elsewhere are hereby incorporated by reference as if set forth in their entirety herein as follows: Great Britain Patent No. 1 230 833 A, German Patent No. 23 63 040 A; European Patent No. 0 481 391 A; U.S. Pat. No. 4,213,861.

The corresponding foreign and international patent publication applications, namely, Federal Republic of Germany Patent Application No. 198 43 308.5, filed on Sep. 22, 1998, having inventors Roland Krüger, Markus Kolczyk, Rainer Kuhnt, and Dietmar Oechsle; and International Application No. PCT/EP99/05779, filed on Aug. 9, 1999, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicants' option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

This invention as described hereinabove in the context of the preferred embodiments is not to be taken as limited to all of the provided details thereof, since modifications and variations thereof may be made without departing from the spirit and scope of the invention.

What is claimed is:

1. A plant for filling containers with liquid, said plant comprising:

apparatus for moving containers to a filling machine;

a filling machine for filling said containers with liquid when filtered;

apparatus for removing filled containers from said filling machine;

said liquid when filtered being provided by apparatus for providing a liquid to be filtered in a first batch to a filter apparatus, said filter apparatus comprising:

a portion for receiving liquid to be filtered;

a portion for receiving liquid when filtered;

an intermediate portion between said portion for receiving liquid to be filtered and said portion receiving liquid when filtered;

a plurality of filter elements operatively connected to said intermediate bottom, to filter liquid received from said portion for receiving liquid to be filtered and passing filtered liquid to said portion for receiving liquid when filtered;

said filter elements generally disposed in said portion for receiving liquid to be filtered;

apparatus for moving a first batch of liquid to be filtered in a first direction from said portion for receiving liquid to be filtered through said filter elements from a first surface to a second surface of said filter elements and thereby collecting solids at said first surface of said filter elements as filter cake;

apparatus for terminating filtering;
apparatus for initiating a first flow of cleaning liquid along a first flow path, over said second surface, for inducing removal of filter cake from said filter elements by flowing a sheet of cleaning liquid over said second surface;
apparatus for pressurizing and directing a flow of gaseous medium in a second flow path separate from said first flow path to force said sheet of cleaning liquid flowing on said second surface through said filter elements from said second surface to said first surface, to dislodge filter cake on said first surface;
apparatus for removing filter cake from said first surface of said filter elements by the interaction of cleaning liquid and gaseous medium;
apparatus for initiating a second flow of cleaning liquid to supply at least said portion for receiving liquid to be filtered with cleaning liquid;
said portion for receiving liquid to be filtered comprising at least one wall;
apparatus for directing said second flow of cleaning liquid along said at least one wall thereby to dislodge solids from said at least one wall;
apparatus for terminating said first flow of cleaning liquid;
apparatus for terminating said second flow of cleaning liquid;
apparatus for removing dislodged solids; and
apparatus for moving a second batch of suspension in said first direction through said filter elements.

2. The plant according to claim 1, wherein:
said intermediate portion comprises an outer wall;
said at least one wall of said at least one portion for receiving liquid to be filtered comprises an upper region;
said apparatus for initiating a second flow of cleaning liquid comprises:
 at least one cleaning device, said at least one cleaning device being generally disposed in said portion for receiving said liquid to be filtered;
 said liquid to be filtered comprises an upper region;
 said at least one cleaning device comprises at least one spray ring for permitting liquid to be sprayed within said filter apparatus, said at least one spray ring being generally disposed in said upper region of said portion for receiving liquid to be filtered;
 a plurality of spray nozzles being operatively connected to said at least one spray ring and configured to direct a spray of cleaning liquid at least against said outer wall of said intermediate portion and against said upper region of said at least one wall of said portion for receiving liquid to be filtered;
and wherein said apparatus for directing said second flow of cleaning liquid includes:
 at least one flow-directing apparatus being configured to receive a spray of cleaning liquid and to divert said spray as a sheet in a downward direction along said at least one wall to dislodge solids from said at least one wall.

3. The plant according to claim 2, wherein said plurality of spray nozzles are configured to direct a spray of cleaning liquid against said upper region of said at least one wall.

4. The plant according to claim 3, wherein:
said at least one flow-directing apparatus comprises a plurality of flow-directing apparatus;
said intermediate portion comprises an outer edge; and
said plurality of flow-directing apparatus comprises at least one recess extending substantially completely around said outer edge.

5. The plant according to claim 4, wherein:
said filter apparatus further comprises an inner wall;
said inner wall comprises an upper region; and
said plurality of flow-directing apparatus comprises at least one recess extending substantially completely around said upper region of said inner wall.

6. The plant according to claim 5, wherein:
said filter apparatus further comprises an upper wall; and
said plurality of flow-directing apparatus comprises at least one groove extending substantially completely around said upper wall.

7. The plant according to claim 6, wherein:
said portion for receiving liquid to be filtered comprises a plurality of wall elements;
said intermediate portion comprises a plurality of wall elements; and
said plurality of flow-directing apparatus further comprises said plurality of wall elements of said portion for receiving liquid to be filtered and said plurality of wall elements of said intermediate portion.

8. The plant according to claim 6, wherein said plurality of flow-directing apparatus further comprises said wall components of said intermediate bottom.

9. The plant according to claim 8, wherein:
said at least one cleaning device comprises at least one recess generally disposed in said intermediate portion;
said filter apparatus having an exterior and an interior;
said at least one recess of said intermediate portion is configured to receive cleaning liquid from at least one of the exterior of said filter apparatus or the interior of said filter apparatus; and
said plurality of filter elements comprise filter candles.

10. A method of operating a plant for filling containers with liquid having an apparatus for moving filtered liquid to containers, said apparatus comprising:
at least two filter candles configured to support deposits of solids produced by filtration of liquid, each candle having a first surface and a second surface;
said deposits of solids comprising filter cake;
at least one portion for receiving liquid to be filtered;
said at least one portion for receiving liquid to be filtered comprising at least one wall;
said at least one wall comprising an upper area;
at least one portion for receiving filtered liquid;
an exterior and an interior;
said exterior being configured to permit movement of cleaning liquid into said interior; and
said method comprising the steps of:
 filtering, said filtering comprising moving a first batch of liquid to be filtered in a first direction from said portion for receiving liquid to be filtered along said first surface and said second surface of each of said at least two filter candles to collect filter cake on said first surface of each of said at least two filter candles;
 terminating said step of filtering;
 permitting a first flow of cleaning liquid along a first flow path and over said second surface of each of said at least two filter candles to remove filter cake from said at least two filter candles;

said first flow of cleaning liquid comprising a sheet of cleaning liquid;

pressurizing and directing a flow of a gaseous medium in a second flow path separate from said first flow path to force said sheet of cleaning liquid to move along said first surface of said at least two filter candles to remove said filter cake from said first surface of each of said at least two filter candles;

removing said filter cake from said first surface of each of said at least two filter candles by said step of permitting said first flow of cleaning liquid and said step of pressurizing and directing;

permitting a second flow of cleaning liquid to supply said at least one portion for receiving liquid with cleaning liquid;

directing said second flow of cleaning liquid along said at least one wall of said at least one portion for receiving liquid to remove filter cake from said wall;

terminating removal of said filter cake;

terminating said second flow of cleaning liquid; and removing any remaining filter cake.

11. The method according to claim 10, wherein said step of moving said first batch of liquid to be filtered and said step of directing said second flow of cleaning liquid are carried out substantially simultaneously.

12. The method according to claim 11, wherein at least one of said step of permitting said first flow of cleaning liquid and said step of permitting said second flow of cleaning liquid is carried out at least twice.

13. The method according to claim 12, wherein:

said step of permitting movement of said second flow of cleaning liquid comprises permitting movement of said second flow of cleaning liquid from said exterior of the filter apparatus to said upper area of said at least one portion for receiving liquid to be filtered; and said step of directing said second flow of cleaning liquid comprises directing said second flow of cleaning liquid as a sheet along and down said at least one wall of said at least one portion for receiving liquid to be filtered.

14. The method according to claim 13, further comprising the step of terminating said flow of said gaseous medium.

15. The method according to claim 14, wherein:

said filter apparatus further comprises an intermediate portion between said portion for receiving liquid to be filtered and said portion for receiving liquid when filtered;

said step of initiating a second flow of cleaning liquid further comprises initiating a second flow of cleaning liquid in said upper area of said portion for receiving liquid to be filtered against said lower wall of said intermediate bottom and said upper region of said at least one wall of said portion for receiving liquid to be filtered; and said step of directing said second flow of cleaning liquid comprises directing said second flow of cleaning liquid in a downward direction such that a sheet of cleaning liquid flows from said upper wall of said portion for receiving said liquid to be filtered to said at least one wall.

16. The method according to claim 15, wherein said step of directing said flow of cleaning liquid is carried out such that said second flow of cleaning liquid is directed against said upper region of said at least one wall of said portion for receiving liquid to be filtered.

17. The method according to claim 16, wherein:

said step of directing said flow of cleaning liquid includes directing a layer of cleaning liquid along said at least one wall of said portion for receiving liquid to be filtered; and said layer comprises a film.

18. A method of operating a plant for filling containers with liquid having a filter apparatus for moving filtered liquid to containers, said filter apparatus comprising:

a plurality of filter arrangements;

an area for receiving liquid to be filtered; and said area for receiving liquid to be filtered comprising at least one wall;

and said method comprising the steps of:

moving a first batch of liquid having solids suspended therein in a first direction from said area for receiving liquid to be filtered through said filter candles from a first surface to a second surface of said filter candles and thereby collecting solids at said first surface of said filter candles as filter cake;

terminating filtering;

removing said filter cake from said filter candles by the interaction of cleaning liquid and gaseous medium;

moving a flow of cleaning liquid to supply at least said portion for receiving liquid to be filtered with cleaning liquid;

directing said flow of cleaning liquid on said at least one wall in a flowing sheet of cleaning liquid thereby to dislodge solids from said at least one wall;

terminating said flow of cleaning liquid; and moving a second batch of liquid having solids suspended therein in said first direction through said plurality of filter arrangements.

19. The method according to claim 18, wherein:

said filter apparatus further comprises:

an area for receiving liquid when filtered;

an intermediate area between said area for receiving said liquid to be filtered and said area for receiving liquid when filtered;

said intermediate area comprises an outer area;

at least one recess being generally disposed in said outer area of said intermediate area;

said area for receiving said liquid to be filtered comprises an upper area;

at least one inner wall;

at least one recess generally disposed in said at least one inner wall; and said step of directing said flow of cleaning liquid is carried out by directing said flow of cleaning liquid to said at least one recesses in said outer area of said intermediate area and directing said flow of cleaning liquid about said upper area of said portion for receiving liquid to be filtered over said at least one recess in said at least one inner wall of said filter apparatus.

20. The method according to claim 19, wherein:

said at least one wall of said area for receiving liquid to be filtered further comprises at least one substantially circular groove;

said at least one groove is configured to direct a said flow of cleaning liquid substantially downward;

said at least one wall comprises a plurality of recesses generally disposed in said at least one wall substantially unevenly with one another with regard to the height of said filter apparatus; and said step of directing said flow of cleaning liquid further comprises directing said flow of cleaning liquid to said plurality of recesses.

* * * * *

UNITED STATES PATENT AND TRADEMARK OFFICE
CERTIFICATE OF CORRECTION

PATENT NO. : 6,365,054 B1
DATED : April 2, 2002
INVENTOR(S) : Roland Krüger, Markus Kolczyk, Rainer Kuhnt and Dietmar Oechsle It is certified that error appears in the above-identified patent and that said Letters Patent is hereby corrected as shown below:

<u>Title page,</u>
Item [57], ABSTRACT,
Line 6, after the first occurrence of "to" insert -- a --.

<u>Column 9,</u>
Line 10, after "also", delete "refereed" and insert -- referred --.

<u>Column 13,</u>
Lines 22, 23 and 24, after "to", delete "M uller" and insert -- Müller --.
Line 45, after the first occurrence of "No.", delete "5,5569,353" and insert -- 5,569,353 --.

Signed and Sealed this

Twenty-first Day of January, 2003

JAMES E. ROGAN
*Director of the United States Patent and Trademark Office*